US012763027B2

(12) United States Patent
Kim et al.

(10) Patent No.: US 12,763,027 B2
(45) Date of Patent: Oct. 13, 2026

(54) DISPLAY DEVICE AND METHOD OF DRIVING THE SAME

(71) Applicant: LG Display Co., Ltd., Seoul (KR)

(72) Inventors: So-Jeong Kim, Paju-si (KR); Chan Park, Paju-si (KR); Seung-Hyeok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/952,360

(22) Filed: Nov. 19, 2024

(65) Prior Publication Data

US 2025/0273157 A1 Aug. 28, 2025

(30) Foreign Application Priority Data

Feb. 27, 2024 (KR) ........................ 10-2024-0028278

(51) Int. Cl.
*G09G 3/3258* (2016.01)
*G09G 5/10* (2006.01)

(52) U.S. Cl.
CPC ............ *G09G 3/3258* (2013.01); *G09G 5/10* (2013.01); *G09G 2300/0842* (2013.01); *G09G 2300/0866* (2013.01); *G09G 2310/0243* (2013.01); *G09G 2310/06* (2013.01)

(58) Field of Classification Search
CPC .. G09G 5/00; G09G 5/10; G09G 3/20; G09G 3/32; G09G 3/34; G09G 3/3258; G09G 3/3266; G09G 3/3225; G09G 3/3233; G09G 3/3275; G09G 3/3291; G09G 3/3208; G09G 2300/0842; G09G 2300/0866; G09G 2310/0243; G09G 2310/06
See application file for complete search history.

(56) References Cited

U.S. PATENT DOCUMENTS

2015/0138258 A1* 5/2015 Lee ...................... G09G 3/3225 345/691
2022/0199016 A1* 6/2022 Kim ...................... G09G 3/3233
2023/0032883 A1* 2/2023 Park ...................... G09G 3/3241
2024/0379045 A1* 11/2024 Zhang .................. G09G 3/3233
2025/0285584 A1* 9/2025 Kim ...................... G09G 3/3233

FOREIGN PATENT DOCUMENTS

KR 20210063653 A 6/2021
KR 20220084602 A 6/2022

* cited by examiner

*Primary Examiner* — Chanh D Nguyen
*Assistant Examiner* — Nguyen H Truong
(74) *Attorney, Agent, or Firm* — Seed Intellectual Property Law Group LLP

(57) ABSTRACT

A display device includes: a timing controlling unit generating an image data, a data control signal and a gate control signal; a data driving unit generating a data signal using the image data and the data control signal; a gate driving unit generating a plurality of scan signals and an emission signal using the gate control signal; and a display panel displaying an image using the data signal, the plurality of scan signals and the emission signal, wherein the emission signal includes a plurality of cycles each having a duty-on period and an duty-off period during one frame, and wherein duty ratios of at least two of the plurality of cycles are different from each other.

14 Claims, 8 Drawing Sheets

DISPLAY DEVICE AND METHOD OF DRIVING THE SAME

CROSS-REFERENCE TO RELATED APPLICATION

The present application claims the priority of Korean Patent Application No. 10-2024-0028278, filed on Feb. 27, 2024, which is hereby incorporated by reference herein in its entirety.

BACKGROUND

Technical Field

The present disclosure relates to a display device.

Description of the Related Art

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

The OLED display device uses a pulse width modulation (PWM) when a luminance is controlled with the same voltage. In an emission state of a low gray level, since a voltage of an anode of a light emitting diode is changed due to a coupling, an abnormal phenomenon such as a luminance inversion, a gamma crush and a black rising occurs and a display quality of a low gray level image is deteriorated.

BRIEF SUMMARY

The present disclosure provides a display device that substantially obviates, among others, one or more of the problems due to limitations and disadvantages of the related art.

The disclosure provides a display device where a voltage variation of an anode of a light emitting diode due to a coupling is reduced by determining duty ratios of an emission signal of a plurality of cycles differently. For example, the present disclosure provides a display device where a voltage variation of an anode of a light emitting diode due to a coupling is reduced and a deterioration such as a gray level inversion, a gamma crush and a black rising is prevented by determining duty ratios of an emission signal of a plurality of cycles differently and a method of driving the display device.

Further, the present disclosure provides a display device where a voltage variation of an anode of a light emitting diode due to a coupling is reduced and a power consumption is reduced to obtain a low power driving by determining a duty ratio of an emission signal of a cycle having a reset period greater than a duty ratio of an emission signal of a cycle not having the reset period.

Additional features and improvements of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other features and improvement and in accordance with the purpose of the present disclosure, as embodied and broadly described herein, a display device includes: a timing controlling unit generating an image data, a data control signal and a gate control signal; a data driving unit generating a data signal using the image data and the data control signal; a gate driving unit generating a plurality of scan signals and an emission signal using the gate control signal; and a display panel displaying an image using the data signal, the plurality of scan signals and the emission signal, wherein the emission signal includes a plurality of cycles each having a duty-on period and an duty-off period during one frame, and wherein duty ratios of at least two of the plurality of cycles are different from each other.

In another aspect of the present disclosure, a method of driving a display device including a timing controlling unit, a data driving unit, a gate driving unit and a display panel includes: during a duty-on period of each of a plurality of cycles of one frame, emitting a light by a subpixel of the display panel; and during a duty-off period of each of the plurality of cycles, applying a data signal to the subpixel of the display panel, wherein duty ratios of at least two of the plurality of cycles are different from each other.

It is to be understood that both the foregoing general description and the following detailed description are explanatory and are intended to provide further explanation of the disclosure.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
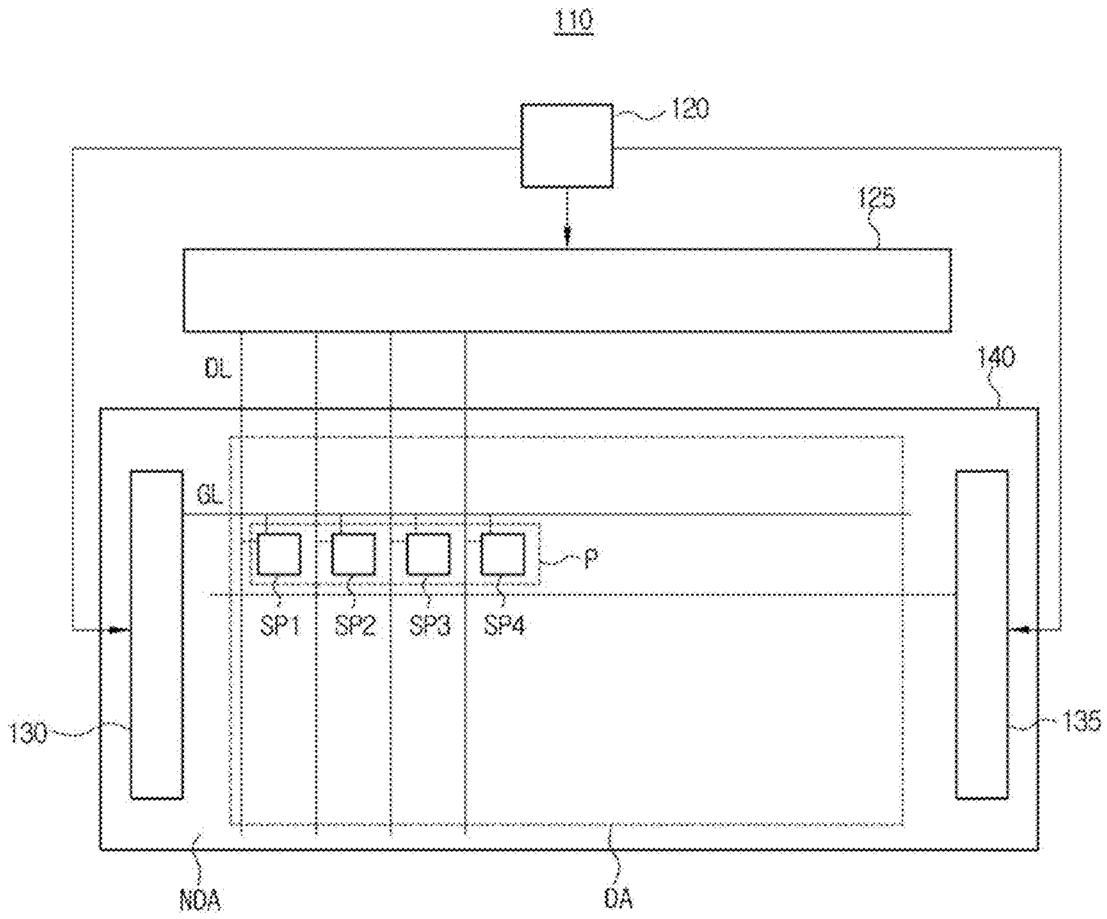
FIG. 1 is a view showing a display device according to an embodiment of the present disclosure.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure includes those of the claims.

The shapes, sizes, ratios, angles, numbers, and the like, which are illustrated in the drawings to describe various example aspects of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" may include a display device in a narrow sense such as liquid crystal module (LCM), an organic light emitting diode (OLED) module and a quantum dot (QD) module including a display panel and a driving unit for driving the display panel. In addition, the term "display device" may include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving unit may be expressed as "a display device", and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control unit for driving the display panel, and a set device may further include a set PCB of a set control unit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or oxygen into the emitting element layer. In addition, the emitting element layer on the array may include an inorganic light emitting layer, for example, a nano-sized material layer or a quantum dot.

The thin film transistor of the present disclosure may include one of an oxide thin film transistor, an amorphous silicon thin film transistor, a low temperature polycrystalline silicon thin film transistor.

Features of various aspects of the present disclosure may be partially or entirely coupled to or combined with each other. They may be linked and operated technically in various ways as those skilled in the art may sufficiently understand. The aspects may be carried out independently of or in association with each other in various combinations.

Hereinafter, a display device according to various example aspects of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings.

FIG. 1 is a view showing a display device according to an embodiment of the present disclosure. The display device may be an organic light emitting diode (OLED) display device.

In FIG. 1, a display device 110 according to an embodiment of the present disclosure includes a timing controlling unit 120, a data driving unit 125, first and second gate driving units 130 and 135 and a display panel 140.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 125, and the gate control signal is transmitted to the first and second gate driving units 130 and 135.

The data driving unit 125 generates a data signal (a data voltage) Vdata (of FIGS. 4 and 5) using the data control signal and the image data transmitted from the timing controlling unit 120 and transmits the data signal to a data line DL of the display panel 140.

The first and second gate driving units 130 and 135 generate a gate signal (a gate voltage) Sc (of FIG. 4), Sc1, Sc2*o*, Sc2*e*, Sc3, Sc4 and Em (of FIG. 5) using the gate control signal transmitted from the timing controlling unit 120 and applies the gate signal Sc, Sc1, Sc2*o*, Sc2*e*, Sc3, Sc4 and Em to a gate line GL of the display panel 140.

The first and second gate driving units 130 and 135 may have a gate in panel (GIP) type to be formed in a non-display area NDA of a substrate of the display panel 140 having the gate line GL, the data line DL and a pixel P.

Although the first and second gate driving units 130 and 135 are disposed in both side portions of the display panel 140 in the embodiment of FIG. 1, one gate driving unit may be disposed in one side portion of the display panel 140 in another embodiment.

The display panel 140 includes a display area DA at a central portion thereof and a non-display area NDA surrounding the display area DA. The display panel 140 displays an image using the gate signal Sc, Sc1, Sc2*o*, Sc2*e*, Sc3, Sc4 and Em and the data signal Vdata. For displaying an image, the display panel 140 includes a plurality of pixels P, a plurality of gate lines GL and a plurality of data lines DL in the display area DA.

Each of the plurality of pixels P includes first to fourth subpixels SP1 to SP4, and the gate line GL and the data line DL cross each other to define the first to fourth subpixels SP1 to SP4. Each of the first to fourth subpixels SP1 to SP4 is connected to the gate line GL and the data line DL. For example, the first to fourth subpixels SP1 to SP4 may correspond to red, green, blue and white colors, respectively.

Figure 4:
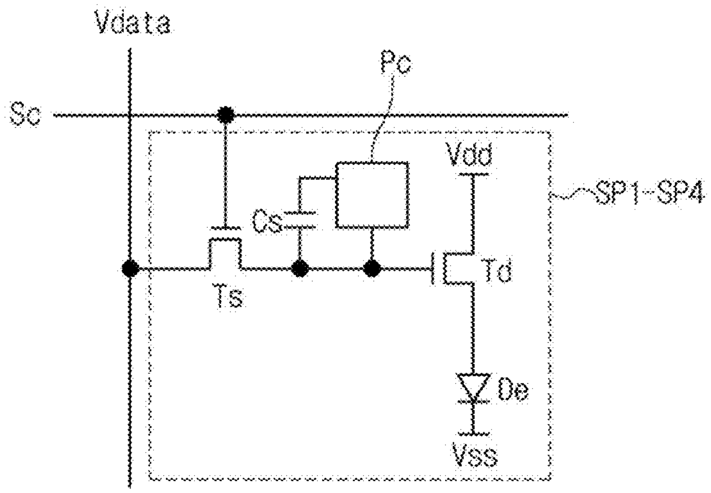
FIG. 4 is a circuit diagram showing a subpixel of a display device according to an embodiment of the present disclosure.

When the display device 110 is an OLED display device, each of the first to fourth subpixels SP1 to SP4 may include a plurality of transistors such as a switching transistor Ts (of FIG. 4), a driving transistor Td (of FIG. 4) and a sensing transistor T3 (of FIG. 5), a storage capacitor Cs (of FIG. 4) and a light emitting diode De (of FIG. 4).

A structure of the display panel 140 and the subpixel SP of the display device 110 will be illustrated with reference to a drawing.

Figure 2:
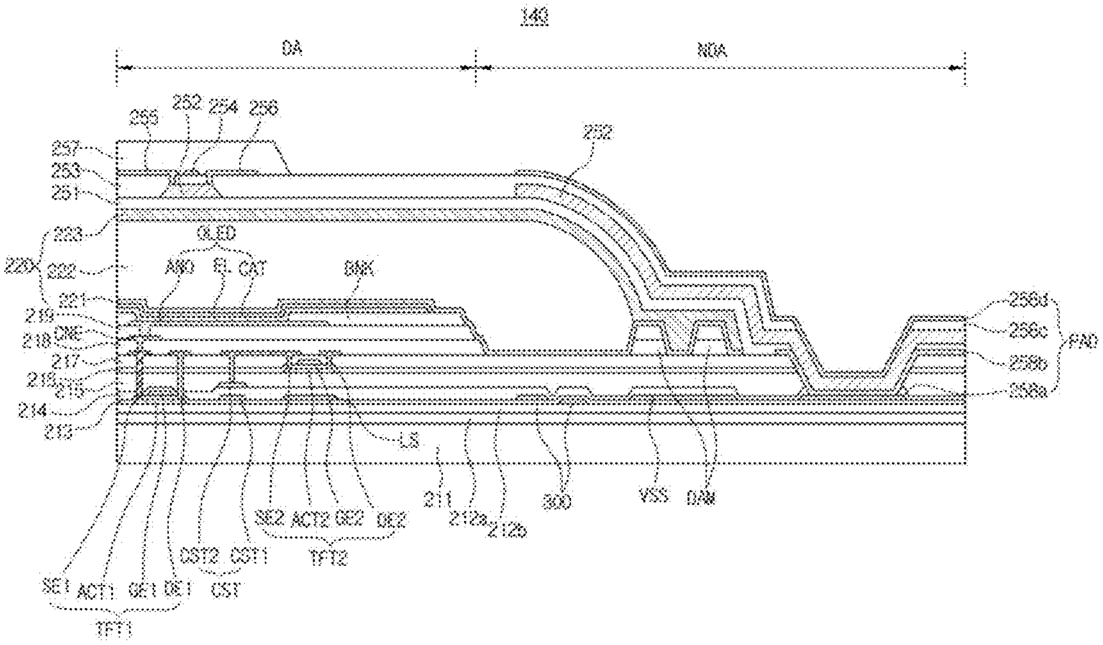
FIG. 2 is a cross-sectional view showing a display panel of a display device according to an embodiment of the present disclosure.
Figure 3:
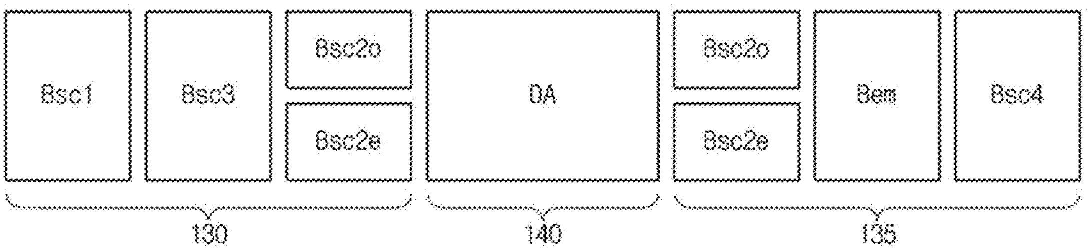
FIG. 3 is a block diagram showing first and second gate driving units and a display panel of a display device according to an embodiment of the present disclosure.
Figure 5:
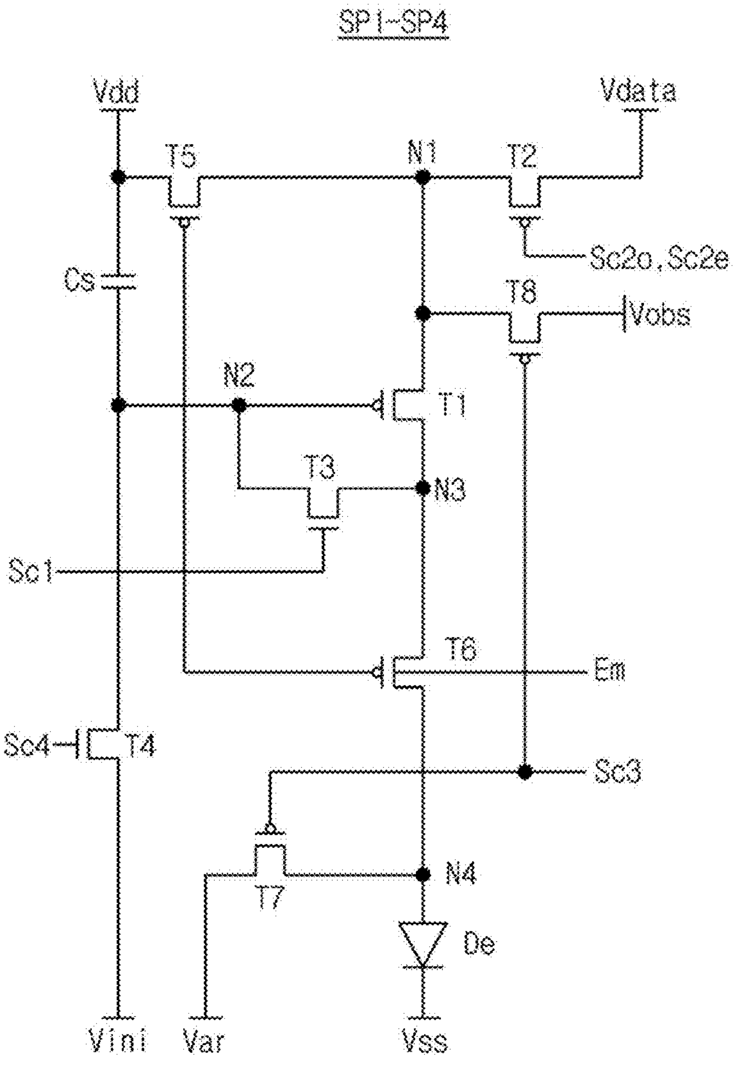
FIG. 5 is a circuit diagram showing a subpixel of a 7T1C structure of a display device according to an embodiment of the present disclosure.

FIG. 2 is a cross-sectional view showing a display panel of a display device according to an embodiment of the present disclosure, FIG. 3 is a block diagram showing first and second gate driving units and a display panel of a display device according to an embodiment of the present disclosure, FIG. 4 is a circuit diagram showing a subpixel of a display device according to an embodiment of the present disclosure, and FIG. 5 is a circuit diagram showing a subpixel of a 7T1C structure of a display device according to an embodiment of the present disclosure.

In FIG. 2, the display panel 140 of the display device 110 according to an embodiment of the present disclosure includes first and second thin film transistors TFT1 and TFT2 and a storage capacitor CST. The first and second thin film transistors TFT1 and TFT2 may include a polycrystalline semiconductor material or an oxide semiconductor material. For example, the first thin film transistor TFT1 may include a polycrystalline semiconductor material, and the second thin film transistor TFT2 may include an oxide semiconductor material.

The first thin film transistor TFT1 is connected to a light emitting diode OLED, and the second thin film transistor TFT2 is connected to the storage capacitor CST.

One subpixel SP includes the light emitting diode OLED and a pixel circuit supplying a driving current to the light emitting diode OLED. The pixel circuit is disposed on a substrate 211, and the light emitting diode OLED is disposed in the pixel circuit. An encapsulating layer 220 is disposed on the light emitting diode OLED to protect the light emitting diode OLED.

The pixel circuit may include a driving thin film transistor, a switching thin film transistor and a storage capacitor. The light emitting diode OLED may include an anode, a cathode and an emitting layer between the anode and the cathode.

The driving thin film transistor and at least one switching thin film transistor use an oxide semiconductor material as an active layer. The thin film transistor using the oxide semiconductor material as an active layer has an excellent blocking effect for a leakage current and has a lower fabrication cost as compared with a thin film transistor using a polycrystalline semiconductor material as an active layer. As a result, to reduce a power consumption and a fabrication cost, the pixel circuit may include the driving thin film transistor and the at least one switching thin film transistor using the oxide semiconductor material.

For example, all of thin film transistors of the pixel circuit may be formed of the oxide semiconductor material, or a portion of the switching thin film transistors may be formed of the oxide semiconductor material.

The thin film transistor using the oxide semiconductor material has a relatively low reliability, while the thin film transistor using the polycrystalline semiconductor material has a relatively rapid operation speed and a relatively high reliability. As a result, the pixel circuit in an embodiment may include both of a switching thin film transistor using the oxide semiconductor material and a switching thin film transistor using the polycrystalline semiconductor material.

The substrate 211 may have a multiple layer of an organic layer and an inorganic layer alternately laminated. For example, the substrate 211 may include an organic layer of an organic insulating material such as polyimide and an inorganic layer of an inorganic insulating material such as silicon oxide ($SiO_2$) alternately laminated.

A lower buffer layer 212*a* is disposed on the substrate 211. The lower buffer layer 212*a* may block a moisture penetrable from an exterior and may have a multiple layer including silicon oxide ($SiO_2$). An auxiliary buffer layer 212*b* for protecting elements from a moisture is disposed on the lower buffer layer 212*a*.

The first thin film transistor TFT1 is disposed on the substrate 211. The first thin film transistor TFT1 may use a polycrystalline semiconductor material as an active layer. The first thin film transistor TFT1 includes a first active layer ACT1 having a channel where an electron or a hole moves, a first gate electrode GE1, a first source electrode SE1 and a first drain electrode DE1.

The first active layer ACT1 includes a first channel region, a first source region at one side of the first channel region and a first drain region at the other side of the first channel region.

The first source region and the first drain region include an intrinsic polycrystalline semiconductor material doped with an impurity of III or V group such as boron (B) or phosphorous (P). The first channel region includes an intrinsic polycrystalline semiconductor material to provide a path where an electron or a hole moves.

The first thin film transistor TFT1 includes a first gate electrode GE1 overlapping the first channel region of the first active layer ACT1. A first gate insulating layer 213 is disposed between the first gate electrode GE1 and the first active layer ACT1. The first gate insulating layer 213 may have a single layer or a multiple layer of an inorganic insulating material such as silicon oxide ($SiO_2$) and silicon nitride (SiNx).

The first thin film transistor TFT1 has a top gate structure where the first gate electrode GE1 is disposed on the first active layer ACT1. As a result, a first capacitor electrode CST1 of the storage capacitor CST and a light shielding layer LS of the second thin film transistor TFT2 may have the same material as the first gate electrode GE1. A fabrication process may be simplified by forming the first gate electrode GE1, the first capacitor electrode CST1 and the light shielding layer LS through one mask process.

The first gate electrode GE1 may include a metallic material. For example, the first gate electrode GE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

A first interlayer insulating layer 214 is disposed on the first gate electrode GE1. For example, the first interlayer insulating layer 214 may include an inorganic insulating material such as silicon oxide ($SiO_2$) and silicon nitride (SiNx).

The display panel 140 may further include an upper buffer layer 215, a second gate insulating layer 216 and a second interlayer insulating layer 217 sequentially disposed on the first interlayer insulating layer 214. The first thin film transistor TFT1 may include a first source electrode SE1 and a first drain electrode DE1 on the second interlayer insulating layer 217, and the first source electrode SE1 and the first drain electrode DE1 may be connected to the first source region and the first drain region, respectively.

For example, the first source electrode SE1 and the first drain electrode DE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The upper buffer layer 215 separates a second active layer ACT2 of an oxide semiconductor material of the second thin film transistor TFT2 from the first active layer ACT1 of a polycrystalline semiconductor material and provides a base for the second active layer ACT2.

The second gate insulating layer 216 covers the second active layer ACT2 of the second thin film transistor TFT2. Since the second gate insulating layer 216 is disposed on the second active layer ACT2 of an oxide semiconductor material, the second gate insulating layer 216 includes an inorganic insulating material. For example, the second gate insulating layer 216 may include silicon oxide ($SiO_2$) and silicon nitride (SiNx).

A second gate electrode GE2 includes a metallic material. For example, the second gate electrode GE2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The second thin film transistor TFT2 is disposed on the upper buffer layer 215 and includes the second active layer ACT2 of an oxide semiconductor material, the second gate electrode GE2 on the second gate insulating layer 216, a second source electrode SE2 and a second drain electrode DE2 on the second interlayer insulating layer 217.

The second active layer ACT2 includes a second channel region, a second source region and a second drain region. The second channel region includes an intrinsic oxide semiconductor material which is not doped with an impurity, and the second source electrode and the second drain electrode are doped with an impurity to be conductorized.

The second thin film transistor TFT2 is disposed above the upper buffer layer 215 and further includes a light shielding layer LS overlapping the second active layer ACT2. The light shielding layer LS blocks a light incident to the second active layer ACT2 to obtain a reliability of the second thin film transistor TFT2. The light shielding layer LS may include the same material as the first gate electrode GE1 and may be disposed on a top surface of the first gate insulating layer 213. The light shielding layer LS may be electrically connected to the second gate electrode GE2 to constitute a dual gate structure.

A fabrication process may be simplified by forming the second source electrode SE2 and the second drain electrode DE2 on the second interlayer insulating layer 217 simultaneously with the first source electrode SE1 and the first drain electrode DE1 through one mask process.

A second capacitor electrode CST2 is disposed on the first interlayer insulating layer 214. The second capacitor electrode CST2 overlaps the first capacitor electrode CST1 to constitute a storage capacitor CST. For example, the second capacitor electrode CST2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The storage capacitor CST stores the data signal supplied through the data line DL and supplies the data signal to the light emitting diode OLED. The storage capacitor CST includes two electrodes corresponding to each other and a dielectric layer between the two electrodes. A first interlayer insulating layer 214 is disposed between the first capacitor electrode CST1 and the second capacitor electrode CST2.

One of the first and second capacitor electrodes CST1 and CST2 of the storage capacitor CST may be electrically connected to one of the second source electrode SE2 and the second drain electrode DE2 of the second thin film transistor TFT2. In another embodiment, a connection of the storage capacitor CST may be changed according to the pixel circuit.

A first planarizing layer 218 and a second planarizing layer 219 are sequentially disposed on the pixel circuit for planarizing the pixel circuit. For example, the first planarizing layer 218 and the second planarizing layer 219 may include an organic insulating material such as polyimide and acrylic resin.

A light emitting diode OLED is disposed on the second planarizing layer 219.

The light emitting diode OLED includes an anode ANO, a cathode CAT and an emitting layer EL between the anode ANO and the cathode CAT. When the pixel circuit uses a low level voltage Vss (of FIG. 4) connected to the cathode CAT commonly, the anode ANO may be disposed in each subpixel as an individual electrode. When the pixel circuit uses a high level voltage connected to the anode ANO commonly, the cathode CAT may be disposed in each subpixel as an individual electrode.

The light emitting diode OLED is electrically connected to a driving element through a central electrode CNE on the first planarizing layer 218. The anode ANO of the light emitting diode OLED and the first source electrode SE1 of the first thin film transistor TFT1 of the pixel circuit are connected to each other through the central electrode CNE.

The anode ANO is connected to the central electrode CNE through a contact hole in the second planarizing layer 219. The central electrode CNE is connected to the first source electrode SE1 through a contact hole in the first planarizing layer 218.

The central electrode CNE connects the first source electrode SE1 and the anode ANO. For example, the central electrode CNE may include a conductive material such as copper (Cu), silver (Ag), molybdenum (Mo) and titanium (Ti).

The anode ANO may have a multiple layer including a transparent conductive layer and an opaque conductive layer having an excellent reflectance. For example, the transparent conductive layer may include a material having a relatively high work function such as indium tin oxide (ITO) and indium zinc oxide (IZO). The opaque conductive layer may have a single layer or a multiple layer of one of aluminum (Al), silver (Ag), copper (Cu), lead (Pb), molybdenum (Mo), titanium (Ti) and an alloy thereof. The anode ANO may have a structure such that a transparent conductive layer, an opaque conductive layer and a transparent conductive layer are sequentially laminated or a structure such that a transparent conductive layer and an opaque conductive layer are sequentially laminated.

The emitting layer EL includes a hole relating layer, an organic emitting layer and an electron relating layer sequentially or reversely laminated.

A bank layer BNK may be referred to as a pixel defining layer exposing the anode ANO of each subpixel SP1 to SP4. The bank layer BNK may include an opaque material (e.g., a black material) to prevent a light interference between the adjacent subpixels SP1 to SP4. The bank layer BNK may include a shielding material of at least one of a color pigment, an organic black and a carbon. A spacer may be disposed on the bank layer BNK.

The cathode CAT is disposed on a top surface and a side surface of the emitting layer EL to oppose the anode ANO. The cathode CAT may be disposed in the entire display area DA as one body. In a top emission type display device, the cathode CAT may include a transparent conductive material such as indium tin oxide (ITO) and indium zinc oxide (IZO).

An encapsulating layer 220 preventing permeation of a moisture may be disposed on the cathode CAT.

The encapsulating layer 220 may block permeation of a moisture or an oxygen of an exterior into the emitting layer EL. The encapsulating layer 220 may include at least one inorganic encapsulating layer and at least one organic encapsulating layer. The encapsulating layer 220 may exemplarily include a first encapsulating layer 221, a second encapsulating layer 222 and a third encapsulating layer 223 in the display device 110.

The first encapsulating layer 221 is disposed on the substrate 211 having the cathode CAT. The third encapsulating layer 223 is disposed on the substrate 211 having the second encapsulating layer 222 and wraps a top surface, a bottom surface and a side surface of the second encapsulating layer 222 with the first encapsulating layer 221. The first encapsulating layer 221 and the third encapsulating layer 223 may minimize or prevent permeation of a moisture or an oxygen of an exterior into the emitting layer EL. For example, the first encapsulating layer 221 and the third encapsulating layer 223 may include an inorganic insulating material applicable to a low temperature deposition such as silicon nitride (SiNx), silicon oxide (SiOx), silicon oxynitride (SiON) and aluminum oxide ($Al_2O_3$). Deterioration of the emitting layer EL vulnerable to a relatively high temperature may be prevented by depositing the first encapsulating layer 221 and the third encapsulating layer 223 under a relatively low temperature.

The second encapsulating layer 222 may alleviate a stress between the layers of the display device 110 due to bending and may planarize a step difference of the layers of the display device 110. For example, the second encapsulating layer 222 may be disposed on the substrate 211 having the first encapsulating layer 221 and may include a non-photosensitive organic insulating material such as acrylic resin, epoxy resin, phenolic resin, polyamide resin, polyimide resin, polyethylene and silicon oxycarbide (SiOC) or a photosensitive organic insulating material such as photoacryl. When the second encapsulating layer 222 is formed through an inkjet method, a dam DAM may be disposed to prevent diffusion of the liquid material for the second encapsulating layer 222 to an edge portion of the substrate 211. The dam DAM may be disposed closer to the edge portion of the substrate 211 than the second encapsulating layer 222. Due to the dam DAM, it is prevented that the second encapsulating layer 222 is diffused to a pad area of an outermost edge portion of the substrate 211 where a conductive pad is disposed.

Although the dam DAM is disposed to prevent diffusion of the second encapsulating layer 222, a moisture may permeate the emitting layer through the exposed second encapsulating layer 222 when the second encapsulating layer 222 is formed higher than the dam DAM. As a result, the dam DAM may be formed to have a number of at least ten.

The dam DAM may be disposed on the second interlayer insulating layer 217 in the non-display area NDA.

The dam DAM may be formed simultaneously with the first planarizing layer 218 and the second planarizing layer 219. For example, a lower layer of the dam DAM may be formed simultaneously with the first planarizing layer 218 and an upper layer of the dam DAM may be formed simultaneously with the second planarizing layer 219 such that the dam DAM has a double layered structure.

As a result, the dam DAM may have the same material as the first planarizing layer 218 and the second planarizing layer 219.

The dam DAM may be disposed to overlap a low level voltage line VSS. For example, the low level voltage line VSS may be disposed under the dam DAM in the non-display area NDA.

The low level voltage line VSS and the first and second gate driving units 130 and 135 having a gate-in-panel (GIP) type are disposed to surround the display area DA of the display panel 140, and the low level voltage line VSS may be disposed outside the first and second gate driving units 130 and 135. Further, the low level voltage line VSS may be connected to the cathode CAT to supply a common voltage. Although the first and second gate driving units 130 and 135 are shown to have a simple structure in FIG. 1, the first and second gate driving units 130 and 135 may include thin film transistors having the same structure as the thin film transistor of the display area DA.

For example, the low level voltage line VSS may have the same material as the first gate electrode GE1 or the same material as the second capacitor electrode CST2, the first source electrode SE1 and the first drain electrode DE1.

The low level voltage line VSS may supply a low level voltage Vss (of FIG. 4) to the subpixel SP1 to SP4 in the display area DA.

A touch layer may be disposed on the encapsulating layer 220. A touch buffer layer 251 of the touch layer may be disposed between a touch sensor metal and the cathode CAT of the light emitting diode OLED, and the touch sensor metal may include a touch connecting line 252 and 254 and a touch electrode 255 and 256.

The touch buffer layer 251 may block permeation of a solution (a developing solution or an etching solution) used in a fabrication process of the touch sensor metal on the touch buffer layer 251 or a moisture of an exterior into the emitting layer EL including an organic material. As a result, the touch buffer layer 251 may prevent deterioration of the emitting layer EL susceptible to a solution or a moisture.

The touch buffer layer 251 includes an organic insulating material applicable to a low temperature lower than about 100° C. and having a dielectric constant of about 1 to about 3 to prevent deterioration of the emitting layer EL including an organic material vulnerable to a relatively high temperature. For example, the touch buffer layer 251 may include a material of an acrylic group, an epoxy group or a siloxane group. The touch buffer layer 251 of an organic insulating material having a planarization property may prevent deterioration of the encapsulating layer 220 due to a bending of the display device 110 and a breakdown of the touch sensor metal on the touch buffer layer 251.

In a touch sensor structure based on a mutual capacitance, the touch electrodes 255 and 256 may be disposed on the touch buffer layer 251 and may alternate each other.

The touch connecting line 252 and 254 may connect the touch electrodes 255 and 256. The touch connecting line 252 and 254 and the touch electrodes 255 and 256 may be disposed in different layers, and a touch insulating layer 253 may be disposed between the touch connecting line 252 and 254 and the touch electrodes 255 and 256.

The touch connecting line 252 and 254 may be disposed to overlap the bank layer BNK to prevent reduction of an aperture ratio.

The touch electrodes 255 and 256 may be electrically connected to a touch driving circuit (not shown) through a portion of the touch connecting line 252 connected to a touch pad PAD passing through a top surface and a side surface of the encapsulating layer 220 and a top surface and a side surface of the dam DAM.

The portion of the touch connecting line 252 may receive a touch driving signal from the touch driving circuit and may transmit the touch driving signal to the touch electrode 255 and 256. The portion of the touch connecting line 252 may transmit a touch sensing signal of the touch electrodes 255 and 256 to the touch driving circuit.

A touch protecting layer 257 may be disposed on the touch electrodes 255 and 256. Although the touch protecting layer 257 is disposed on the touch electrodes 255 and 256 in an embodiment of FIG. 2, the touch protecting layer 257 may extend a front or a rear of the dam DAM to be disposed on the touch connecting line 252.

A color filter (not shown) may be disposed on the encapsulating layer 220. The color filter may be disposed on the touch layer or may be disposed between the encapsulating layer 220 and the touch layer.

In FIG. 3, the first gate driving unit 130 of the display device 110 includes a scan1 block Bsc1, an odd scan2 block Bsc2*o*, an even scan2 block Bsc2*e* and a scan3 block Bsc3, and the second gate driving unit 135 of the display device 110 includes an odd scan2 block Bsc2*o*, an even scan2 block Bsc2*e*, a scan4 block Bsc4 and an emission block Bem. The display area DA of the display panel 140 is disposed between the first and second gate driving units 130 and 135.

In another embodiment, the disposition structure of the scan1 block Bsc1, the odd scan2 block Bsc2*o*, the even scan2 block Bsc2*e*, the scan3 block Bsc3, the scan4 block Bsc4 and the emission block Bem in the first and second gate driving units 130 and 135 may be variously changed.

For example, the scan1 block Bsc1 is disposed farther from the display panel 140 than the scan3 block Bsc3 and the scan4 block Bsc4 is disposed farther from the display panel 140 than the emission block Bem in an embodiment of FIG. 3. In another embodiment, the scan3 block Bsc3 may be disposed farther from the display panel 140 than the scan1 block Bsc1 and the emission block Bem may be disposed farther from the display panel 140 than the scan4 block Bsc4.

Each of the scan1 block Bsc1, the odd scan2 block Bsc2*o*, the even scan2 block Bsc2*e* and the scan3 block Bsc3 of the first gate driving unit 130 and the odd scan2 block Bsc2*o*, the even scan2 block Bsc2*e*, the scan4 block Bsc4 and the emission block Bem of the second gate driving unit 135 may be one stage of a shift register, and the shift register may include a plurality of stages connected to each other in a cascade type.

In the first gate driving unit 130, the scan1 block Bsc1, the odd scan2 block Bsc2*o*, the even scan2 block Bsc2*e* and the scan3 block Bsc3 generate a scan1 signal Sc1 (of FIG. 5), an odd scan2 signal Sc2*o* (of FIG. 5), an even scan2 signal Sc2*e* (of FIG. 5) and a scan3 signal Sc3 (of FIG. 5), respectively.

In the second gate driving unit 135, the odd scan2 block Bsc2*o*, the even scan2 block Bsc2*e*, the scan4 block Bsc4 and the emission block Bem generate the odd scan2 signal Sc2*o*, the even scan2 signal Sc2*e*, a scan4 signal Sc4 (of FIG. 5) and an emission signal Em (of FIG. 5), respectively.

The scan1 signal Sc1 of the scan1 block Bsc1 is supplied to a third transistor T3 (of FIG. 5) in each subpixel SP1 to SP4 of the display area DA through the gate line GL. The odd scan2 signal Sc2*o* of the odd scan2 block Bsc2*o* is supplied to a second transistor T2 (of FIG. 5) in each subpixel SP1 to SP4 of an odd horizontal pixel line of the display area DA through the gate line GL, and the even scan2 signal Sc2*e* of the even scan2 block Bsc2*e* is supplied to a second transistor T2 in each subpixel SP1 to SP4 of an even horizontal pixel line of the display area DA through the gate line GL.

The scan3 signal Sc3 of the scan3 block Bsc3 is supplied to seventh and eighth transistors T7 and T8 (of FIG. 5) in each subpixel SP1 to SP4 of the display area DA through the gate line GL. The scan4 signal Sc4 of the scan4 block Bsc4 is supplied to a fourth transistor T4 (of FIG. 5) in each subpixel SP1 to SP4 of the display area DA through the gate line GL, and the emission signal Em of the emission block Bem is supplied to fifth and sixth transistors T5 and T6 (of FIG. 5) in each subpixel SP1 to SP4 of the display area DA through the gate line GL.

In another embodiment, the first and second gate driving units 130 and 135 may have a symmetric structure. For example, each of the first and second gate driving units 130 and 135 may include the scan1 block Bsc1, the odd scan2 block Bsc2*o*, the even scan2 block Bsc2*e*, the scan3 block Bsc3, the scan4 block Bsc4 and the emission block Bem.

In FIG. 4, each of the first, second, third and fourth subpixels SP1, SP2, SP3 and SP4 of the display panel 140 of the display device 110 according to an embodiment of the present disclosure includes a switching transistor Ts, a driving transistor Td, a compensation part Pc, a storage capacitor Cs and a light emitting diode De. Active layers of the switching transistor Ts and the driving transistor Td may be formed of a semiconductor material, such as an oxide semiconductor material, amorphous semiconductor material, polycrystalline semiconductor material, or organic semiconductor material.

The oxide semiconductor material may have an excellent effect of preventing a leakage current and relatively inexpensive manufacturing cost. The oxide semiconductor may be formed of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor can include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO).

The polycrystalline semiconductor material has a fast movement speed of carriers such as electrons and holes and thus has high mobility, and has low energy power consumption and superior reliability. The polycrystalline semiconductor may be formed of polycrystalline silicon (poly-Si).

The amorphous semiconductor material may be formed of amorphous silicon (a-Si).

For example, the switching transistor Ts and the driving transistor Td may be an oxide semiconductor thin film transistor, amorphous silicon thin film transistor or a low temperature polycrystalline silicon thin film transistor.

The switching transistor Ts is switched according to the scan signal Sc of the gate signal. A gate electrode of the switching transistor Ts is connected to the scan signal Sc, a source electrode of the switching transistor Ts is connected to a first capacitor electrode of the storage capacitor Cs and the compensation part Pc, and a drain electrode of the switching transistor Ts is connected to the data signal Vdata.

The driving transistor Td is switched according to a voltage of the first capacitor electrode of the storage capacitor Cs. A gate electrode of the driving transistor Td is connected to the first capacitor electrode of the storage capacitor Cs and the compensation part Pc, a source electrode of the driving transistor Td is connected to an anode of the light emitting diode De, and a drain electrode of the driving transistor Td is connected to the high level voltage Vdd.

The compensation part Pc is connected among the switching transistor Ts, the driving transistor Td and the storage capacitor Cs and compensates a variation of the threshold voltage Vth of the driving transistor Td.

The storage capacitor Cs stores the data signal Vdata. A first capacitor electrode of the storage capacitor Cs is connected to the source electrode of the switching transistor Ts and the compensation part Pc, and a second capacitor electrode of the storage capacitor Cs is connected to the compensation part Pc.

The light emitting diode De is connected between the driving transistor Td and the low level voltage Vss and emits a light of a luminance proportional to a current of the driving transistor Td. An anode of the light emitting diode De is connected to the source electrode of the driving transistor Td, and a cathode of the light emitting diode De is connected to the low level voltage Vss.

The data signal Vdata is supplied from the data driving unit 125 to each subpixel SP1 to SP4 of the display panel 140, and the scan signal Sc is supplied from the first and second gate driving units 130 and 135 to each subpixel SP1 to SP4 of the display panel 140.

In the pixel circuit of the present disclosure, various configurations of internal compensation circuits are possible. For example, a number of transistors TFTs in the pixel circuit of the present disclosure may be three or more, and a number of capacitors may be one or more. For example, each of the first to fourth subpixels SP1 to SP4 may have one of a 3T1C structure including three transistors (3T) and one capacitor (1C), a 6T1C structure including six transistors and one capacitor, a 7T1C structure including seven transistors and one capacitor and a 8T1C structure including eight transistors and one capacitor.

In FIG. 5, each of the first to fourth subpixels SP1 to SP4 of the display panel 140 of the display device 110 according to an embodiment of the present disclosure includes first to eighth transistors T1 to T8, a storage capacitor Cs and a light emitting diode De. At least one of the first to eighth transistors T1 to T8 may be an oxide semiconductor thin film transistor, and the others of the first to eighth transistors T1 to T8 may be low temperature polycrystalline silicon thin film transistor.

For example, the first, second, fifth, sixth, seventh and eighth transistors T1, T2, T5, T6, T7 and T8 may be a positive (P) type low temperature polycrystalline silicon thin film transistor, and the third and fourth transistors T3 and T4 may be a negative (N) type oxide semiconductor thin film transistor.

The first transistor T1 as a driving transistor is switched according to a voltage of the first capacitor electrode of the storage capacitor Cs. A gate electrode of the first transistor T1 is connected to a second node N2, a source electrode of the first transistor T1 is connected to a first node N1, and a drain electrode of the first transistor T1 is connected to a third node N3.

The second transistor T2 as a switching transistor is switched according to an odd scan2 signal Sc2*o* or an even scan2 signal Sc2*e*. A gate electrode of the second transistor T2 is connected to the odd scan2 signal Sc2*o* or the even scan2 signal Sc2*e*, a source electrode of the second transistor T2 is connected to the first node N1, and a drain electrode of the second transistor T2 is connected to the data signal Vdata.

The third transistor T3 as a sensing transistor is switched according to a scan1 signal Sc1. A gate electrode of the third transistor T3 is connected to the scan1 signal Sc1, a source electrode of the third transistor T3 is connected to the third node N3, and a drain electrode of the third transistor T3 is connected to the second node N2.

The fourth transistor T4 as an initializing transistor is switched according to a scan4 signal Sc4. A gate electrode of the fourth transistor T4 is connected to the scan4 signal Sc4, a source electrode of the fourth transistor T4 is connected to an initial voltage Vini, and a drain electrode of the fourth transistor T4 is connected to the second node N2.

The fifth transistor T5 as an emitting transistor is switched according to an emission signal Em. A gate electrode of the fifth transistor T5 is connected to the emission signal Em, a source electrode of the fifth transistor T5 is connected to a high level voltage Vdd and the second capacitor electrode of the storage capacitor Cs, and a drain electrode of the fifth transistor T5 is connected to the first node N1.

The sixth transistor T6 as an emitting transistor is switched according to the emission signal Em. A gate electrode of the sixth transistor T6 is connected to the emission signal Em, a source electrode of the sixth transistor T6 is connected to the third node N3, and a drain electrode of the sixth transistor T6 is connected to a fourth node N4.

The seventh transistor T7 as a reset transistor is switched according to a scan3 signal Sc3. A gate electrode of the seventh transistor T7 is connected to the scan3 signal Sc3, a source electrode of the seventh transistor T7 is connected to the fourth node N4, and a drain electrode of the seventh transistor T7 is connected to an anode reset signal (an anode reset voltage) Var.

The eighth transistor T8 as a reset transistor is switched according to a scan3 signal Sc3. A gate electrode of the eighth transistor T8 is connected to the scan3 signal Sc3, a source electrode of the eighth transistor T8 is connected to the first node N1, and a drain electrode of the eighth transistor T8 is connected to a stress signal (a stress voltage) Vobs.

The storage capacitor Cs stores the data signal Vdata and the threshold voltage Vth. A first capacitor electrode of the storage capacitor Cs is connected to the second node N2, and a second capacitor electrode of the storage capacitor Cs is connected to the high level voltage Vdd and the source electrode of the fifth transistor T5.

The light emitting diode De is connected between the sixth and seventh transistors T6 and T7 and the low level voltage Vss to emit a light of a luminance proportional to a current of the first transistor T1. An anode of the light emitting diode De is connected to the fourth node N4, and a cathode of the light emitting diode De is connected to the low level voltage Vss.

The source electrode of the first transistor T1, the source electrode of the second transistor T2, the drain electrode of the fifth transistor T5 and the source electrode of the eighth transistor T8 constitute the first node N1, and the gate electrode of the first transistor T1, the drain electrode of the third transistor T3, the first capacitor electrode of the storage capacitor Cs and the drain electrode of the fourth transistor T4 constitute the second node N2. The drain electrode of the first transistor T1, the source electrode of the third transistor T3 and the source electrode of the sixth transistor T6 constitute the third node N3, and the drain electrode of the sixth transistor T6, the source electrode of the seventh transistor T7 and the anode of the light emitting diode De constitute the fourth node N4.

In the display device 110, a luminance of a light emitted from the light emitting diode De is adjusted using a pulse width modulation and a variable low level voltage.

Figure 6:
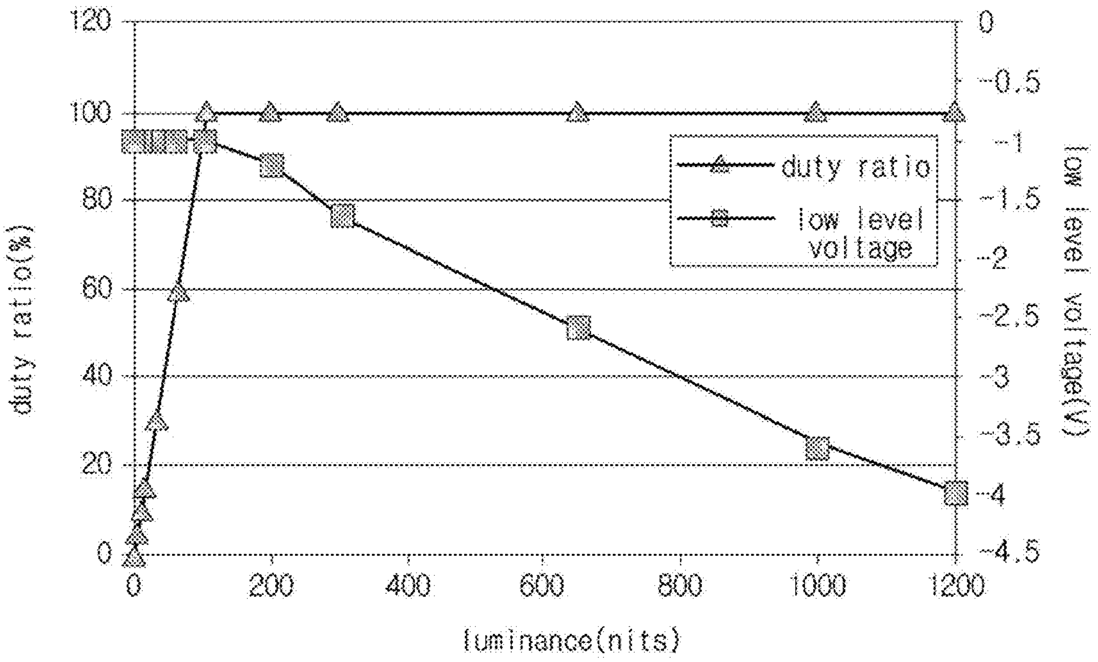
FIG. 6 is a view showing a luminance with respect to a duty ratio and a low level voltage of a display device according to an embodiment of the present disclosure.

FIG. 6 is a view showing a luminance with respect to a duty ratio and a low level voltage of a display device according to an embodiment of the present disclosure.

In FIG. 6, the light emitting diode De of the display device 110 according to an embodiment of the present disclosure emits a light having a luminance smaller than about 100 nits due to a pulse width modulation (PWM) under the same voltage and emits a light of a luminance equal to or greater than about 100 nits due to a variable low level voltage Vss.

For example, the luminance of the light emitted from the light emitting diode De may increase within a range smaller than about 100 nits by increasing the duty ratio within a range of about 0% to about 100%, and the luminance of the light emitted from the light emitting diode De may increase within a range equal to or greater than about 100 nits by decreasing the low level voltage Vss within a range of about −0.75V to about −4V.

The duty ratio may be defined as a percentage of an emission period with respect to an entire high level period of a square wave.

The display device 110 displays a plurality of luminances using a plurality of luminance bands having different maximum luminance value according to an input of a user, and the plurality of luminance bands may correspond to a plurality of display brightness values (DBVs).

The display device 110 adjusts an image luminance using the display brightness values DBVs corresponding to a user's input. For example, when the luminance band includes first to thirteenth bands, each of the first to thirteenth bands may correspond to the display brightness values DBVs of 2047 to 117 of 11 bits and luminances of about 2175 nits to about 4 nits.

The seventh band may correspond to the display brightness value DBV of 505 of 11 bits and the luminance of about 100 nits. In the first to sixth bands where the display brightness value DBV is greater than the luminance of about 100 nits, the luminance is changed by adjusting the low level voltage Vss with the duty ratio fixed. In the seventh to thirteenth bands where the display brightness value DBV is equal to or smaller than the luminance of about 100 nits, the luminance is changed by adjusting the duty ratio with the low level voltage Vss fixed.

In the display device 110 according to an embodiment of the present disclosure, a power consumption may be reduced and a natural luminance change can be obtained by adjusting a luminance in a relatively low luminance range due to a pulse width modulation and adjusting a luminance in a relatively high luminance range due to a variable low level voltage.

In the display device 110, one frame may be classified into a plurality of cycles.

Figure 7:
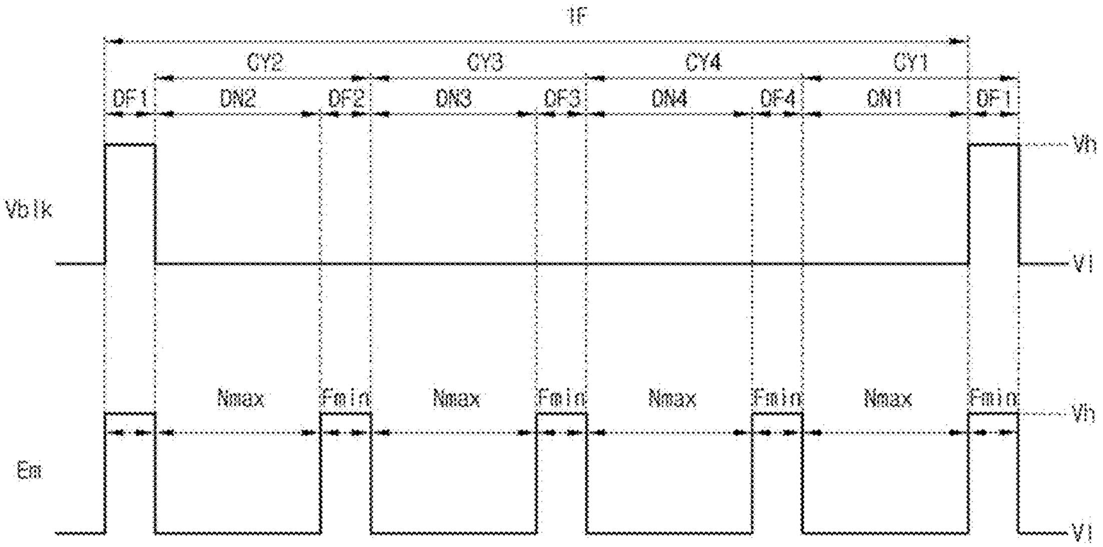
FIG. 7 is a view showing a blank signal and an emission signal of one frame of a display device according to an embodiment of the present disclosure.
Figure 8:
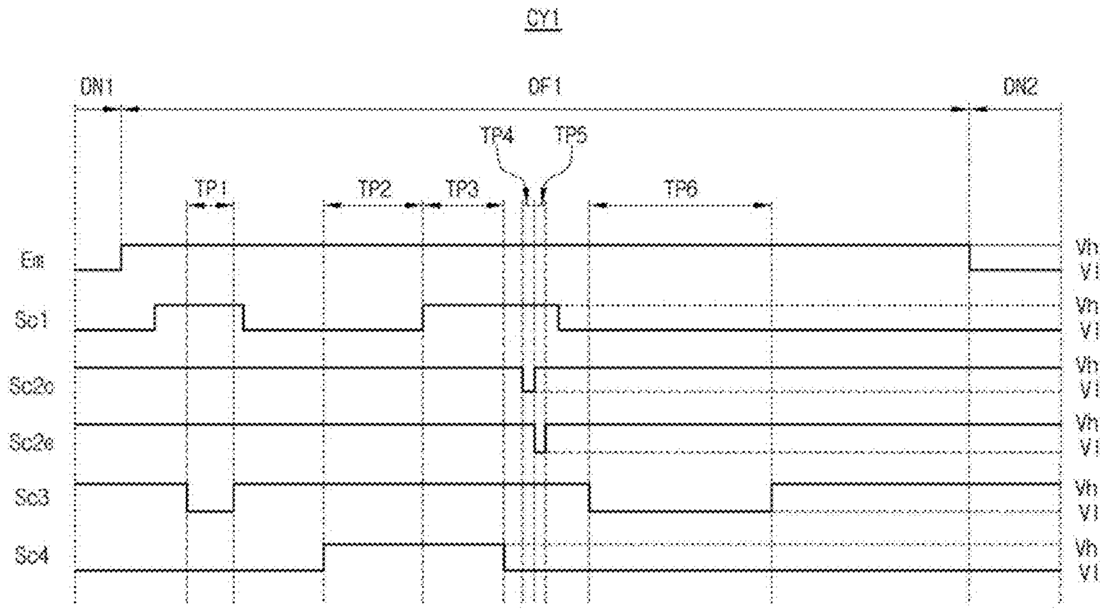
FIG. 8 is a view showing an emission signal and a scan signal of a first cycle of a display device according to an embodiment of the present disclosure.
Figure 9:
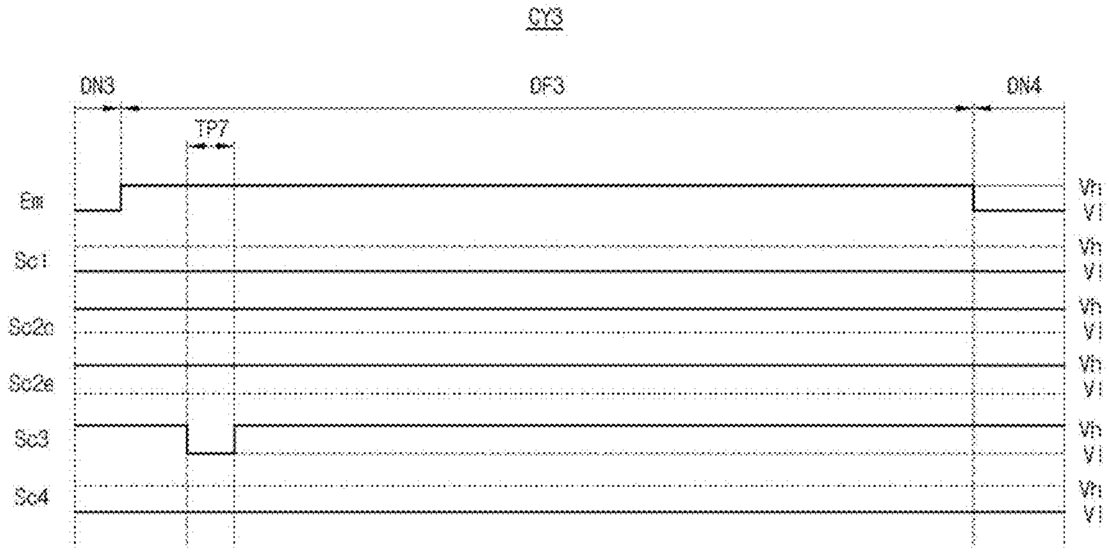
FIG. 9 is a view showing an emission signal and a scan signal of a third cycle of a display device according to an embodiment of the present disclosure.
Figure 10:
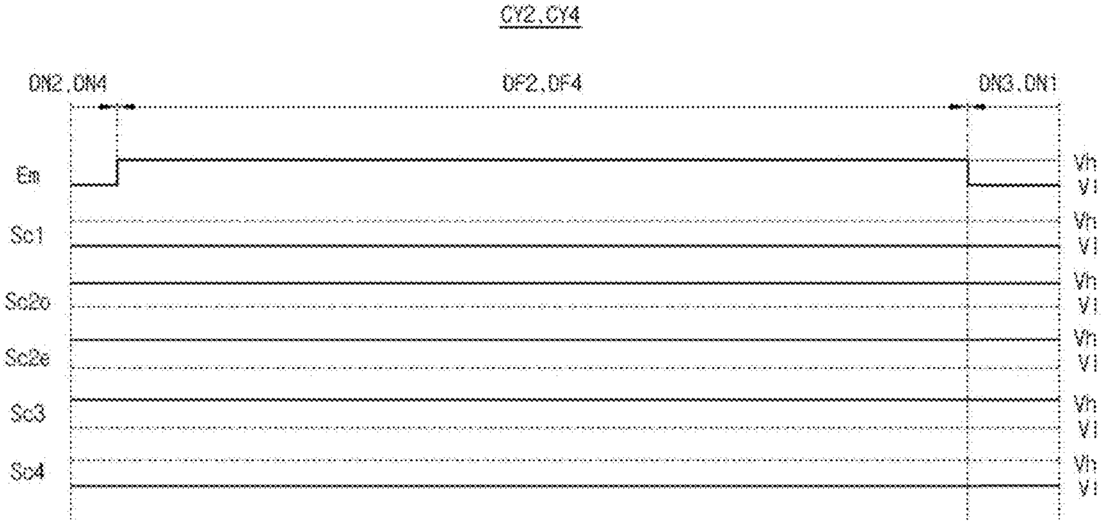
FIG. 10 is a view showing an emission signal and a scan signal of second and fourth cycles of a display device according to an embodiment of the present disclosure.

FIG. 7 is a view showing a blank signal and an emission signal of one frame of a display device according to an embodiment of the present disclosure, FIG. 8 is a view showing an emission signal and a scan signal of a first cycle of a display device according to an embodiment of the present disclosure, FIG. 9 is a view showing an emission signal and a scan signal of a third cycle of a display device according to an embodiment of the present disclosure, and FIG. 10 is a view showing an emission signal and a scan signal of second and fourth cycles of a display device according to an embodiment of the present disclosure.

In FIG. 7, one frame 1F of the display device 110 according to an embodiment of the present disclosure includes first to fourth cycles CY1 to CY4, and the first to fourth cycles CY1 to CY4 include a duty-on period DN1 to DN4 and a duty-off period DF1 to DF4.

One frame 1F may be classified according to a blank signal Vblk. The first cycle CY1 may include a first duty-on period DN1 where the emission signal Em has a logic low voltage Vl and the light emitting diode De is turned on (emits a light) and a first duty-off period DF1 where the emission signal Em has a logic high voltage Vh and the light emitting diode De is turned off (does not emit a light).

Similarly, the second cycle CY2 after the first cycle CY1 may include a second duty-on period DN2 and a second duty-off period DF2, the third cycle CY3 after the second cycle CY2 may include a third duty-on period DN3 and a third duty-off period DF3, and the fourth cycle CY4 after the third cycle CY3 may include a fourth duty-on period DN4 and a fourth duty-off period DF4.

As a result, in the display device 110 according to an embodiment of the present disclosure, the light emitting diode De emits a light four times of the first to fourth duty-on periods DN1 to DN4 during one frame 1F.

When each of the first to fourth duty-on periods DN1 to DN4 has a maximum on-duty Nmax, each of the first to fourth duty-off periods DF1 to DF4 may have a minimum off-duty Fmin.

When the light emitting diode De emits a light of a maximum luminance of a plurality of luminance bands (a luminance adjustment by the pulse width modulation (PWM) and the fixed low level voltage Vss) where the display brightness value (DBV) is equal to or smaller than about 100 nits, each of the first to fourth duty-on periods DN1 to DN4 of the emission signal Em may have the maximum on-duty Nmax, and each of the first to fourth duty-off periods DF1 to DF4 of the emission signal Em may have the minimum off-duty Fmin.

For example, the maximum luminance, the maximum on-duty Nmax and the minimum off-duty Fmin of the plurality of luminance bands where the display brightness value (DBV) is equal to or smaller than about 100 nits may be about 100 nits, about 89.1% and about 10.9%, respectively.

Although one frame 1F includes the first to fourth cycles CY1 to CY4 in an embodiment of FIG. 7, one frame 1F may include first and second cycles CY1 and CY2 or first to eighth cycles CY1 to CY8 in another embodiment.

In FIG. 8, during a first period TP1 of the first duty-off period DF1 of the first cycle CY1 of the display device 110 according to an embodiment of the present disclosure, the emission signal Em, the scan1 signal Sc1, the odd scan2 signal Sc2*o* and the even scan2 signal Sc2*e* have a logic high voltage Vh, and the scan3 signal Sc3 and the scan4 signal Sc4 have a logic low voltage Vl.

As a result, the first, third, seventh and eighth transistors T1, T3, T7 and T8 are turned on, and the second, fourth, fifth and sixth transistors T2, T4, T5 and T6 are turned off. Accordingly, the stress voltage Vobs is applied to the first, third and second nodes N1, N3 and N2 through the eighth, first and third transistors T8, T1 and T3, and the anode reset voltage Var is applied to the fourth node N4 through the seventh transistor T7.

During the first period TP1, the first to fourth nodes N1 to N4 are reset, and a hysteresis phenomenon due to the previous frame is prevented.

During a second period TP2, the emission signal Em, the odd scan2 signal Sc2*o*, the even scan2 signal Sc2*e*, the scan3 signal Sc3 and the scan4 signal Sc4 have the logic high voltage Vh, and the scan1 signal Sc1 has the logic low voltage Vl.

As a result, the fourth transistor T4 is turned on, and the first, second, third, fifth, sixth, seventh and eighth transistors T1, T2, T3, T5, T6, T7 and T8 are turned off. Accordingly, the initial voltage Vini is applied to the second node N2 through the fourth transistor T4.

During the second period TP2, the second node N2 is initialized to the initial voltage Vini.

During a third period TP3, the emission signal Em, the scan1 signal Sc1, the odd scan2 signal Sc2*o*, the even scan2 signal Sc2*e*, the scan3 signal Sc3 and the scan4 signal Sc4 have the logic high voltage Vh.

As a result, the first, third and fourth transistors T1, T3 and T4 are turned on, and the second, fifth, sixth, seventh and eighth transistors T2, T5, T6, T7 and T8 are turned off. Accordingly, the initial voltage Vini is applied to the second, third and first nodes N2, N3 and N1 through the fourth, third and first transistors T4, T3 and T1.

During the third period TP3, the second, third and first nodes N2, N3 and N1 are initialized to the initial voltage Vini.

During a fourth period TP4, the emission signal Em, the scan1 signal Sc1, the even scan2 signal Sc2*e* and the scan3 signal Sc3 have the logic high voltage Vh, and the odd scan2 signal Sc2*o* and the scan4 signal Sc4 have the logic low voltage Vl.

As a result, the first, second and third transistors T1, T2 and T3 are turned on, and the fourth, fifth, sixth, seventh and eighth transistors T4, T5, T6, T7 and T8 are turned off. Accordingly, the data signal Vdata is applied to the second node N2 through the second, first and third transistors T2, T1 and T3 of an odd horizontal pixel line.

During the fourth period TP4, the data signal Vdata is applied to the second node N2 of the odd horizontal pixel line, and a sum (Vdata+Vth) of the data voltage Vdata and a threshold voltage Vth of the first transistor T1 is applied to the gate electrode of the first transistor T1 to be stored in the storage capacitor Cs.

During a fifth period TP5, the emission signal Em, the scan1 signal Sc1, the odd scan2 signal Sc2*o* and the scan3 signal Sc3 have the logic high voltage Vh, and the even scan2 signal Sc2*e* and the scan4 signal Sc4 have the logic low voltage Vl.

As a result, the first, second and third transistors T1, T2 and T3 are turned on, and the fourth, fifth, sixth, seventh and eighth transistors T4, T5, T6, T7 and T8 are turned off. Accordingly, the data signal Vdata of an even horizontal pixel line is applied to the second node N2 through the second, first and third transistors T2, T1 and T3.

During the fifth period TP5, the data signal Vdata is applied to the second node of the even horizontal pixel line, and a sum (Vdata+Vth) of the data voltage Vdata and the threshold voltage Vth of the first transistor T1 is applied to the gate electrode of the first transistor T1 to be stored in the storage capacitor Cs.

During a sixth period TP6, the emission signal Em, the odd scan2 signal Sc2*o* and the even scan2 signal Sc2*e* have the logic high voltage Vh, and the scan1 signal Sc1, the scan3 signal Sc3 and the scan4 signal Sc4 have the logic low voltage Vl.

As a result, the first, seventh and eighth transistors T1, T7 and T8 are turned on, and the second, third, fourth, fifth and sixth transistors T2, T3, T4, T5 and T6 are turned off. Accordingly, the stress voltage Vobs is applied to the first and third nodes N1 and N3 through the eighth and first transistors T8 and T1, and the anode reset voltage Var is applied to the fourth node N4 through the seventh transistor T7.

During the sixth period TP6, the first, third and fourth nodes N1, N3 and N4 are reset, and a hysteresis phenomenon due to the previous frame is prevented.

In FIG. 9, during a seventh period TP7 of the third duty-off period DF3 of the third cycle CY3 of the display device 110 according to an embodiment of the present disclosure, the emission signal Em, the odd scan2 signal Sc2*o* and the even scan2 signal Sc2*e* have the logic high voltage Vh, and the scan1 signal Sc1, the scan3 signal Sc3 and the scan4 signal Sc4 have the logic low voltage Vl.

As a result, the seventh and eighth transistors T7 and T8 are turned on, and the first, second, third, fourth, fifth and sixth transistors T1, T2, T3, T4, T5 and T6 are turned off. Accordingly, the stress voltage Vobs is applied to the first node N1 through the eighth transistor T8, and the anode reset voltage Var is applied to the fourth node N4 through the seventh transistor T7.

During the seventh period TP7, the first and fourth nodes N1 and N4 are reset, and a hysteresis phenomenon due to the previous frame is prevented.

In FIG. 10, during the second and fourth duty-off periods DF2 and DF4 of the second and fourth cycles CY2 and CY4 of the display device 110 according to an embodiment of the present disclosure, the emission signal Em, the odd scan2 signal Sc2*o*, the even scan2 signal Sc2*e* and the scan3 signal Sc3 have the logic high voltage Vh, and the scan1 signal Sc1 and the scan4 signal Sc4 have the logic low voltage Vl.

As a result, the first, second, third, fourth, fifth, sixth, seventh and eighth transistors T1, T2, T3, T4, T5, T6, T7 and T8 are turned off. Accordingly, a voltage of the previous cycle is maintained.

During the second and fourth duty-off periods DF2 and DF4 of the second and fourth cycles CY2 and CY4, the voltage of the first, second, third and fourth nodes N1, N2, N3 and N4 is kept as the voltage of the first and third cycles CY1 and CY3 of the previous cycle.

During the first, second, third and fourth duty-on periods DN1, DN2, DN3 and DN4, the odd scan2 signal Sc2*o*, the even scan2 signal Sc2*e* and the scan3 signal Sc3 have the logic high voltage Vh, and the emission signal Em, the scan1 signal Sc1 and the scan4 signal Sc4 have the logic low voltage Vl.

As a result, the first, third, fifth and sixth transistors T1, T3, T5 and T6 are turned on, and the second, third, fourth, seventh and eighth transistors T2, T3, T4, T7 and T8 are turned off. Accordingly, the high level voltage Vdd is applied to the fourth node N4 through the fifth, first and sixth transistors T5, T1 and T6. Since the threshold voltage Vth is compensated, a current corresponding to the data signal Vdata flows through the first transistor T1 turned on.

During the first, second, third and fourth duty-on periods DN1, DN2, DN3 and DN4, the light emitting diode De emits a light corresponding to the data signal Vdata of the present frame.

During the first and third duty-off periods DF1 and DF3 of the first and third cycles CY1 and CY3 of the display device 110 according to an embodiment of the present disclosure, the scan3 signal has the logic low voltage Vl, and the seventh transistor T7 is turned on. As a result, the fourth node N4 is reset due to the anode reset voltage Var. During the second and fourth duty-off periods DF2 and DF4 of the second and fourth cycles CY2 and CY4, the scan3 signal Sc3 does not have the logic low voltage Vl, and the seventh transistor T7 is not turned on. As a result, the fourth node N4 is not reset due to the anode reset voltage Var.

Accordingly, after the voltage of the fourth node N4 rapidly decreases to the anode reset voltage Var during the first and sixth periods TP1 and TP6 of the first duty-off period DF1, the voltage of the fourth node N4 gradually increases due to application of the high level voltage Vdd during the second duty-on period DN2, and the voltage of the fourth node N4 increases and then decreases due to a kickback according to rising and falling of the emission signal Em during the second duty-off period DF2.

Next, after the voltage of the fourth node N4 gradually increases due to application of the high level voltage Vdd during the third duty-on period DN3 and the voltage of the fourth node N4 increases and then decreases due to the kickback according to rising and falling of the emission signal Em during the third duty-off period DF3, the voltage of the fourth node N4 rapidly decreases to the anode reset voltage Var during the seventh period TP7 of the third duty-off period DF3.

Next, the voltage of the fourth node N4 gradually increases due to application of the high level voltage Vdd during the fourth duty-on period DN4, and the voltage of the fourth node N4 increases and then decreases due to the kickback according to rising and falling of the emission signal Em during the fourth duty-off period DF4.

The voltage of the fourth node N4 rapidly decreases and a peak luminance decreases due to reset by the anode reset voltage Var during the first and third duty-off periods DF1 and DF3 of the first and third cycles CY1 and CY3. As a result, a luminance variation of a light emitted from the light emitting diode De according to a voltage variation of the fourth node N4 of the first and third duty-off periods DF1 and DF3 of the first and third cycles CY1 and CY3 is greater than a luminance variation of a light emitted from the light emitting diode De according to a voltage variation of the fourth node N4 of the second and fourth duty-off periods DF2 and DF4 of the second and fourth cycles CY2 and CY4 where the rapid decrease (reset) of the voltage of the fourth node N4 does not occur.

Figure 11:
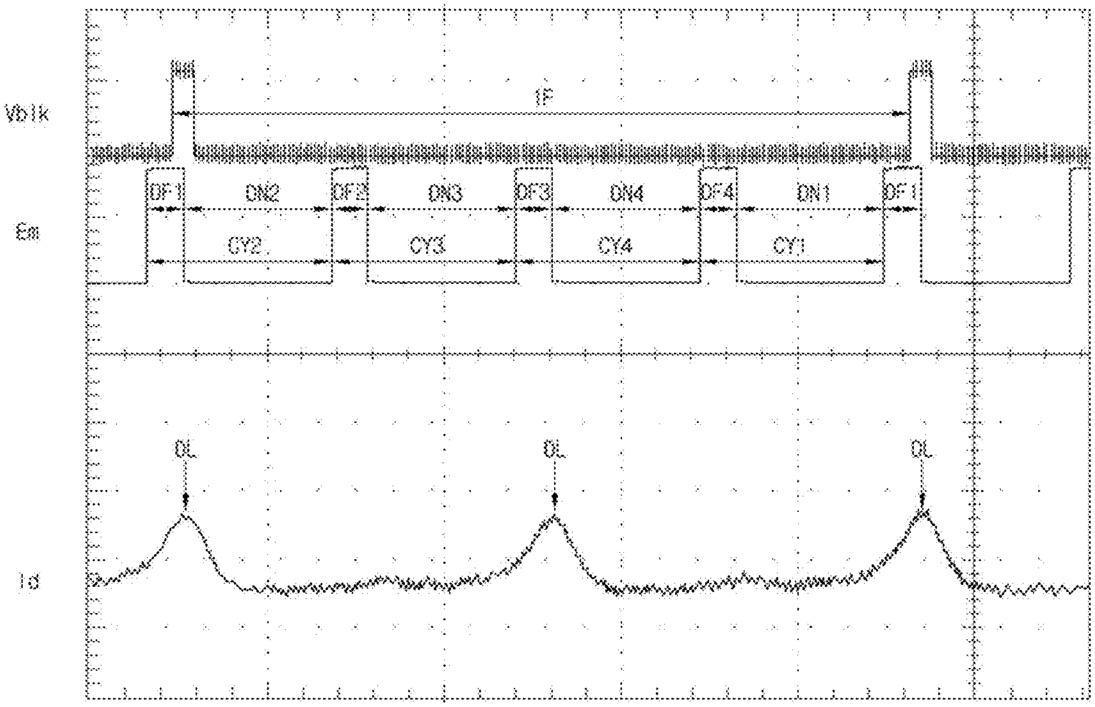
FIG. 11 is a view showing an emission signal and a luminance variation of first, second, third and fourth cycles of a display device according to an embodiment of the present disclosure.

FIG. 11 is a view showing an emission signal and a luminance variation of first, second, third and fourth cycles of a display device according to an embodiment of the present disclosure.

In FIG. 11, one frame 1F of the display device 110 according to an embodiment of the present disclosure includes first, second, third and fourth cycles CY1, CY2, CY3 and CY4. The first cycle CY1 includes the first duty-on period DN1 and the first duty-off period DF1, the second cycle CY2 includes the second duty-on period DN2 and the second duty-off period DF2, the third cycle CY3 includes the third duty-on period DN3 and the third duty-off period DF3, the fourth cycle CY4 includes the fourth duty-on period DN4 and the fourth duty-off period DF4.

The luminance of the light emitted from the light emitting diode De may be changed according to the voltage variation of the fourth node N4 due to the kickback in the first, second, third and fourth duty-off periods DF1, DF2, DF3 and DF4. The first and third duty-off periods DF1 DF3 where decrease of the peak luminance due to the anode reset voltage Var occurs have a relatively great luminance variation DL, while the second and fourth duty-off periods DF2 and DF4 where decrease of the peak luminance due to the anode reset voltage Var does not occur have a relatively small luminance variation.

As widths of the first, second, third and fourth duty-off periods DF1, DF2, DF3 and DF4 increase according to decrease of the duty ratio, a variation period of the emission signal Em increases and a voltage variation amount of the fourth node N4 due to the kickback increases.

In the display device 110 according to an embodiment of the present disclosure, the duty-off period where decrease of the peak luminance due to the anode reset voltage Var does not occur further increases as compared with the duty-off period where decrease of the peak luminance due to the anode reset voltage Var occurs.

Figure 12:
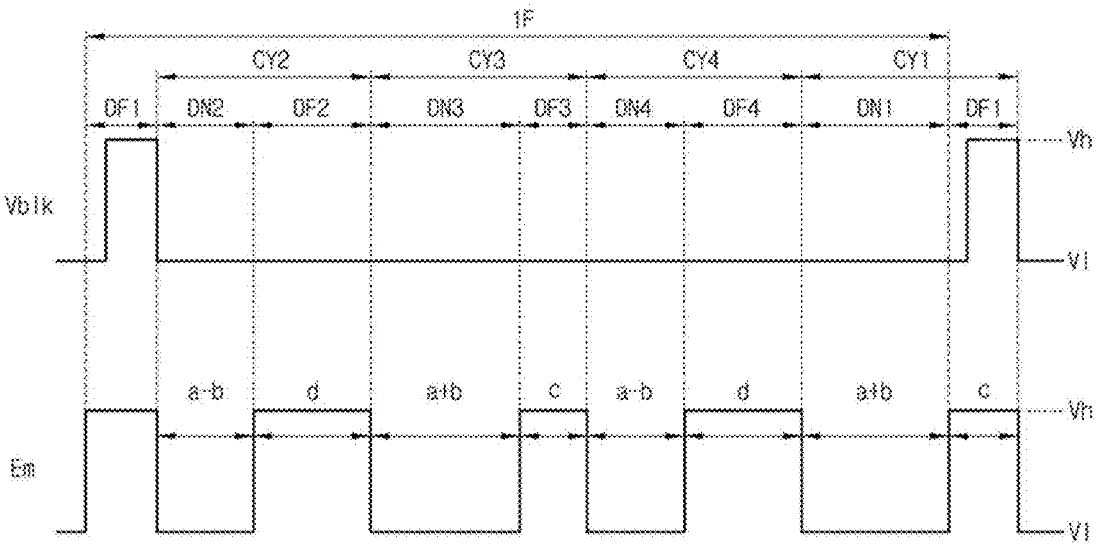
FIG. 12 is a view showing an on-duty and an off-duty of an emission signal of one frame of a display device according to an embodiment of the present disclosure.

FIG. 12 is a view showing an on-duty and an off-duty of an emission signal of one frame of a display device according to an embodiment of the present disclosure.

In FIG. 12, one frame 1F of the display device 110 according to an embodiment of the present disclosure includes the first, second, third and fourth cycles CY1, CY2, CY3 and CY4, and the first, second, third and fourth cycles CY1, CY2, CY3 and CY4 includes the first, second, third and fourth duty-on periods DN1, DN2, DN3 and DN4 and the first, second, third and fourth duty-off periods DF1, DF2, DF3 and DF4.

As a result, the light emitting diode De emits a light four times of the first, second, third and fourth duty-on periods DN1, DN2, DN3 and DN4 during one frame 1F.

When the display device 110 is driven with a predetermined duty ratio, the widths of the first and third duty-off periods DF1 and DF3 where rapid decrease of the voltage of the fourth node N4 due to the anode reset voltage Var occurs are determined smaller than the widths of the second and fourth duty-off periods DF2 and DF4 where rapid decrease of the voltage of the fourth node N4 due to the anode reset voltage Var does not occur, and the widths of the first and third duty-on periods DN1 and DN3 corresponding to the first and third duty-off periods DF1 and DF3 are determined greater than the widths of the second and fourth duty-on periods DN2 and DN4 corresponding to the second and fourth duty-off periods DF2 and DF4. As a result, the luminance variation due to the kickback according to the emission signal Em is reduced or minimized.

For example, when the display device 110 is driven with the duty ratio of a, each of the first and third duty-on periods DN1 and DN3 may be determined to have the on-duty of (a+b), and each of the second and fourth duty-on periods DN2 and DN4 may be determined to have the on-duty of (a−b) smaller than (a+b).

Each of the first and third duty-off periods DF1 and DF3 may have the duty ratio of c, and each of the second and fourth duty-off periods DF2 and DF4 may have the duty ratio of d greater than c. (a+b+c=100%, a−b+d=100%, c=100%−(a+b), d=100%−a+b=c+2b; a, b, c are a positive integer)

When the display device 110 is driven with the duty ratio of about 80%, each of the first and third duty-on periods DN1 and DN3 may be determined to have the on-duty of about 90%, and each of the second and fourth duty-on periods DN2 and DN4 may be determined to have the on-duty of about 70%. Each of the first and third duty-off periods DF1 and DF3 may be determined to have the off-duty of about 10%, and each of the second and fourth duty-off periods DF2 and DF4 may be determined to have the off-duty of about 30%.

Further, each of the on-duty of (a+b) and the on-duty of (a−b) may be smaller than the maximum on-duty Nmax, and each of the off-duty of c and the off-duty of d may be greater than the minimum off-duty Fmin.

In the display device 110 according to an embodiment of the present disclosure, the width of the duty-off period where decrease of the peak luminance occurs is determined to be smaller than the width of the duty-off period where decrease of the peak luminance does not occur, and the width of the duty-on period corresponding to the duty-off period where decrease of the peak luminance occurs is determined to be greater than the width of the duty-on period corresponding to the duty-off period where decrease of the peak luminance does not occur. Since the voltage variation of the anode of the light emitting diode due to the coupling of the emission signal is reduced or minimized, the deterioration such as the gray level inversion, the gamma crush and the black rising is prevented, and the power consumption is reduced to obtain the low power driving.

It will be apparent to those skilled in the art that various modifications and variation may be made in the present disclosure without departing from the scope of the disclosure. Thus, it is intended that the present disclosure cover the modifications and variations of this disclosure including those of the appended claims and their equivalents.

The various embodiments described above can be combined to provide further embodiments. Aspects of the embodiments can be modified, if necessary to employ concepts of the various embodiment to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a timing controlling unit configured to generate an image data, a data control signal and a gate control signal;

a data driving unit configured to generate a data signal using the image data and the data control signal;

a gate driving unit configured to generate a plurality of scan signals and an emission signal using the gate control signal; and a display panel configured to display an image using the data signal, the plurality of scan signals and the emission signal, wherein the emission signal includes a plurality of cycles each having a duty-on period and a duty-off period during one frame, wherein duty ratios of at least two of the plurality of cycles are different from each other, wherein the plurality of cycles include first, second, third and fourth cycles, wherein the duty-off period of the first and third cycles includes the reset period, wherein the reset period is omitted in the duty-off period of the second and fourth cycles, wherein a width of the duty-off period of the first and third cycles is smaller than a width of the duty-off period of the second and fourth cycles, and wherein a width of the duty-on period of the first and third cycles is greater than a width of the duty-on period of the second and fourth cycles.

2. The display device of claim 1, wherein a duty ratio of one of the plurality of cycles having a reset period is greater than a duty ratio of another of the plurality of cycles where the reset period is omitted.

3. The display device of claim 1, wherein the display panel is driven with a duty ratio of a, wherein the duty-on period of the first and third cycles has an on-duty of (a+b), and the duty-on period of the second and fourth cycles has an on-duty of (a-b), and wherein the duty-off period of the first and third cycles has an on-duty of c, and the duty-off period of the second and fourth cycles has an on-duty of (c+2b), a, b, c being a positive integer, and a+b+c=100%.

4. The display device of claim 1, wherein the plurality of scan signals include a scan1 signal, an odd scan2 signal, an even scan2 signal, a scan3 signal and a scan4 signal, wherein the display panel includes a plurality of subpixels, and wherein each of the plurality of subpixels comprises:

a storage capacitor connected to a high level voltage;

a first transistor configured to be switched according to a voltage of a first capacitor electrode of the storage capacitor;

a second transistor configured to be switched according to one of the odd scan2 signal and the even scan2 signal and connected to the data signal and the first transistor;

a third transistor configured to be switched according to the scan1 signal and connected to the storage capacitor and the first transistor;

a fourth transistor configured to be switched according to the scan4 signal and connected to the storage capacitor and an initial voltage;

a fifth transistor configured to be switched according to the emission signal and connected to the high level voltage and the first transistor;

a sixth transistor configured to be switched according to the emission signal and connected to the first transistor;

a seventh transistor configured to be switched according to the scan3 signal and connected to an anode reset voltage and the sixth transistor;

an eighth transistor configured to be switched according to the scan3 signal and connected to a stress voltage and the first transistor; and a light emitting diode connected between the sixth transistor and a low level voltage.

5. The display device of claim 4, wherein at least one of the first to eighth transistors is an oxide semiconductor thin film transistor.

6. The display device of claim 4, wherein the plurality of cycles include first, second, third and fourth cycles, wherein the duty-off period of the first and third cycles includes first, second, third, fourth, fifth and sixth periods, wherein, during the first period, the first, third, seventh and eighth transistors are turned on, the second, fourth, fifth and sixth transistors are turned off, the stress voltage is applied to first, third and second nodes, and the anode reset voltage is applied to a fourth node, wherein, during the second period, the fourth transistor is turned on, the first, second, third, fifth, sixth, seventh and eighth transistors are turned off, and the initial voltage is applied to the second node, wherein, during the third period, the first, third and fourth transistors are turned on, the second, fifth, sixth, seventh and eighth transistors are turned off, and the initial voltage is applied to the second, third and first nodes, wherein, during the fourth period, the first, second and third transistors are turned on, the fourth, fifth, sixth, seventh and eighth transistors are turned off, and the data signal is applied to the second nodes, wherein, during the fifth period, the first, second and third transistors are turned on, the fourth, fifth, sixth, seventh and eighth transistors are turned off, and the data signal is applied to the second node, and wherein, during the sixth period, the first, seventh and eighth transistors are turned on, the second, third, fourth, fifth and sixth transistors are turned off, the stress voltage is applied to the first and third nodes, and the anode reset voltage is applied to the fourth node.

7. The display device of claim 6, wherein the duty-off period of the second and fourth cycles includes seventh, eighth, ninth and tenth periods, wherein, during the seventh period, the fourth transistor is turned on, the first, second, third, fifth, sixth, seventh and eighth transistors are turned off, and the initial voltage is applied to the second node, wherein, during the eighth period, the first, third and fourth transistors are turned on, the second, fifth, sixth, seventh and eighth transistors are turned off, and the initial voltage is applied to the second, third and first nodes, wherein, during the ninth period, the first, second and third transistors are turned on, the fourth, fifth, sixth, seventh and eighth transistors are turned off, and the data signal is applied to the second node, and wherein, during the tenth period, the first, second and third transistors are turned on, the fourth, fifth, sixth, seventh and eighth transistors are turned off, and the data signal is applied to the second node.

8. The display device of claim 4, wherein the light emitting diode emits a light having a luminance smaller than 100 nits by changing the duty ratio under a same voltage and emits a light of a luminance equal to or greater than 100 nits by changing the low level voltage.

9. The display device of claim 1, wherein the plurality of scan signals include a scan1 signal, an odd scan2 signal, an even scan2 signal, a scan3 signal and a scan4 signal, wherein the gate driving unit includes first and second gate driving units disposed at both sides of the display panel, wherein the first gate driving unit includes a scan1 block generating the scan1 signal, an odd scan2 block generating the odd scan2 signal, an even scan2 block generating the even scan2 signal and a scan3 block generating the scan3 signal, and wherein the second gate driving unit includes an odd scan2 block generating the odd scan2 signal, an even scan2 block generating the even scan2 signal, a scan4 block generating the scan4 signal and an emission block generating the emission signal.

10. The display device of claim 9, wherein the scan1 block is disposed farther from the display panel than the scan3 block, or the scan3 block is disposed farther from the display panel than the scan1 block, and wherein the scan4 block is disposed farther from the display panel than the emission block, or the emission block is disposed farther from the display panel than the scan4 block.

11. A display device, comprising:

a timing controlling unit configured to generate an image data, a data control signal and a gate control signal;

a data driving unit configured to generate a data signal using the image data and the data control signal;

a gate driving unit configured to generate a plurality of scan signals and an emission signal using the gate control signal; and a display panel configured to display an image using the data signal, the plurality of scan signals and the emission signal, wherein the emission signal includes a plurality of cycles each having a duty-on period and a duty-off period during one frame, wherein duty ratios of at least two of the plurality of cycles are different from each other, and wherein the width of the duty-off period where decrease of a peak luminance occurs is smaller than the width of the duty-off period where decrease of the peak luminance does not occur.

12. A method of driving a display device including a timing controlling unit, a data driving unit, a gate driving unit and a display panel, comprising:

during a duty-on period of each of a plurality of cycles of one frame, emitting a light by a subpixel of the display panel; and during a duty-off period of each of the plurality of cycles, applying a data signal to the subpixel of the display panel, wherein duty ratios of at least two of the plurality of cycles are different from each other, wherein the plurality of cycles include first, second, third and fourth cycles, wherein the duty-off period of the first and third cycles includes the reset period, wherein the reset period is omitted in the duty-off period of the second and fourth cycles, wherein a width of the duty-off period of the first and third cycles is smaller than a width of the duty-off period of the second and fourth cycles, and wherein a width of the duty-on period of the first and third cycles is greater than a width of the duty-on period of the second and fourth cycles.

13. The method of claim 12, wherein a duty ratio of one of the plurality of cycles having a reset period is greater than a duty ratio of another one of the plurality of cycles that does not have a reset period.

14. A method of driving a display device including a timing controlling unit, a data driving unit, a gate driving unit and a display panel, comprising:

during a duty-on period of each of a plurality of cycles of one frame, emitting a light by a subpixel of the display panel; and during a duty-off period of each of the plurality of cycles, applying a data signal to the subpixel of the display panel, wherein duty ratios of at least two of the plurality of cycles are different from each other, wherein a third width of a duty-off period where decrease of a peak luminance occurs is smaller than a fourth width of a duty-off period where decrease of the peak luminance does not occur.

* * * * *